No. 831,686. PATENTED SEPT. 25, 1906.
J. A. SAYWARD.
APPLIANCE FOR LOADING AND UNLOADING LUMBER TRUCKS.
APPLICATION FILED JAN. 13, 1906.

WITNESSES:
John T. Schrott
F. C. Gibson.

INVENTOR
Joseph A. Sayward
BY
Fred G. Dieterich
ATTORNEY

UNITED STATES PATENT OFFICE.

JOSEPH AUSTEN SAYWARD, OF VICTORIA, BRITISH COLUMBIA, CANADA.

APPLIANCE FOR LOADING AND UNLOADING LUMBER-TRUCKS.

No. 831,686.     Specification of Letters Patent.     Patented Sept. 25, 1906.

Application filed January 13, 1906. Serial No. 295,894.

*To all whom it may concern:*

Be it known that I, JOSEPH AUSTEN SAYWARD, a citizen of the Dominion of Canada, residing at the city of Victoria, in the Province of British Columbia, Canada, have invented new and useful Improvements in an Appliance for Loading and Unloading Lumber-Trucks, of which the following is a specification.

My invention relates to an improved device designed for application to a truck such as is generally used for the conveyance of lumber in a sawmill or timber-yard, and is intended to facilitate the transference of lumber from the truck onto the trestles or supports upon which it is usually deposited or from the trestles onto a truck.

Figure 1:
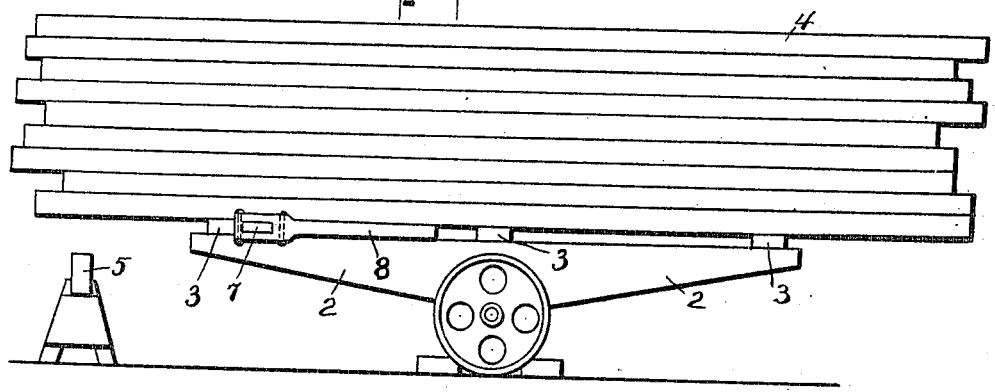
Figure 2:
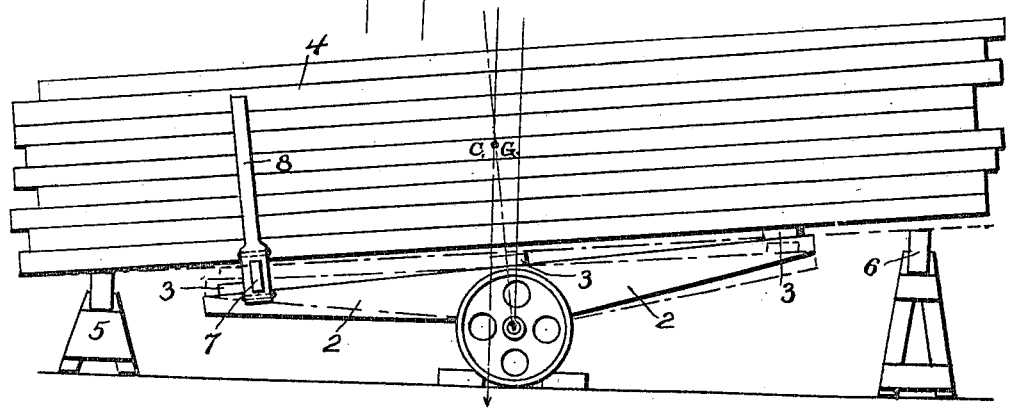

The invention is fully set forth in the following specification and illustrated in the drawings which accompany it, Figure 1 being a side elevation of a loaded truck, showing my elevating-bolster in its normal position; Fig. 2, a similar view showing the bolster elevated and its load lifted ready to deposit on or just lifted off trestles or supports; and Fig. 3, a cross-section, to an enlarged scale, of the elevating-bolster.

In the drawings, 2 represents the frame of a two-wheeled truck such as is commonly used for the conveyance of lumber in a sawmill or timber-yard, 3 being fixed bolsters or cross-bearers on which the load normally rests. 4 represents the load, and 5 and 6 the trestles upon which the load is to be deposited, the height of which from the ground should be sufficient to permit the ready passage of the truck when its elevating-bolster is down under lumber resting on them.

The supports or trestles are represented as of unequal height, for in the operation of the device, as the center of gravity of a load is above its pivotal axis on the truck-wheels, an advantage will be found in providing the first trestle 5, upon which the load is rested before elevating the bolster, of a height less than the mean height of the under side of the load from the ground and the secondary trestle 6 of a greater height. Thus when the load is tipped to rest one end of it on the lower trestle 5 a vertical line through the center of gravity of the load (see Fig. 2) will fall between the axis of the wheels and the trestle 5, upon which the load is rested, and a comparatively trifling effort will then turn the bolster 7 and through the leverage of the truck-frame 2 elevate the other end a sufficient amount to enable the secondary trestle 6 to be introduced; but although this is an advantageous condition it is not an essential one, as the supports may be of equal height.

Extending across the upper side of the truck-frame 2, adjacent to one of the cross-bearers 3, is placed the elevating-bolster 7, which forms an essential feature of this invention.

The thickness of the bolster 7 is approximately that of the fixed cross-bearers 3, and the width of its cross-section is such that when it is turned on its edge it will elevate one end of the under side of the load a sufficient amount from the ground or floor-level to attain the desired purpose in the manner to be described later.

Figure 3:
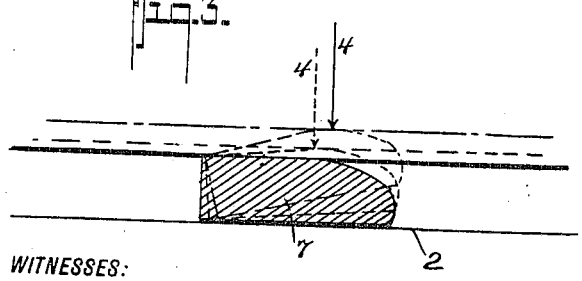

The ends of the bolster are carried beyond the width of the truck-frame, and one or each is furnished with an arm or lever 8, secured to it, by which the bolster 7 may be turned on its edge or its flat, as required. To facilitate the turning of the bolster on its edge under the load, the side and upper edge which contacts with the load during the operation of turning should be rounded somewhat, as illustrated in Fig. 3, so that the point of contact during the earlier efforts of lifting is not toward the extreme width of the bolster.

In the operation of the device to transfer a load of lumber from a truck onto trestles the wheels are scotched and the load is tipped (see Fig. 2) to rest one end of it on the lower trestle 5. The bolster 7 is then turned, by means of the arm or lever 8, to interpose the width instead of the thickness of the bolster between that end of the truck-frame and the load, and that effort elevates, through the leverage of the truck-frame, the opposite or lighter end of the load a sufficient amount to enable the secondary trestle 6 to be placed under it. The bolster 7 is then turned again on its flat, when the load is deposited on the trestles, (see dot-and-dash lines in Fig. 2,) and the truck is free to be removed from under the load.

To transfer a load from the trestles, the operation is reversed. The truck is run under the lumber and the bolster elevated, which lifts one end off the trestle. The trestle may then be removed and the truck-load wheeled away.

Although specifically designed for the transference of lumber, and the construction of the bolster and its arm is represented in its simplest form, such as can be readily furnished in a lumber-yard, I do not desire to be confined to the particular manner of construction revealed herein, as such may be modified to adapt the invention to the requirements of the work for which it is to be employed, the essential feature of the invention being the combination with a two-wheeled truck of a bolster between the load and the frame of the truck, the cross-section width of which bolster is relatively greater than the thickness, and the provision of a means for turning the bolster on edge or flat, as required, and also in the use therewith of trestles of unequal height as facilitating materially the operation.

Having now particularly described the nature of my said invention and the manner of its operation, I hereby declare that what I claim as new, and desire to be protected in by Letters Patent, is—

1. As a means for transferring lumber from a two-wheeled truck onto supports or trestles, the combination with a two-wheeled truck, of supports onto which the lumber is to be deposited one of which supports is higher than the other and the mean height of which supports is greater than the mean height of the under side of the lumber on the truck from the ground, and means interposed between the truck-frame toward the lower support and the under side of the lumber for increasing the space between the under side of the lumber and that end of the truck-frame whereby the mean height of the under side of the lumber from the ground is elevated above the mean height of the supports.

2. As a means for transferring lumber from supports onto a truck or from a truck onto supports; the combination with a two-wheeled truck having cross-bearers upon which the load rests when on the truck, of an elevating-bolster extending across the width of the truck adjacent to one of the end cross-bearers thereof the thickness of such bolster being approximately that of the cross-bearers of the truck and the width relatively greater, and means for turning said bolster on its edge so that its greater dimension is interposed between the upper side of the truck and the under side of the load.

3. In a device of the class described, the combination with a two-wheeled truck, of a bolster extending across the width of the truck having a width relatively greater than its thickness and having the side and the corner which contact with the load in the act of turning rounded to an approximate ellipse in cross-section, and means for turning such bolster.

4. In a device of the class described, the combination with a wheeled truck, of a bolster held across the width of the truck-frame and unattached thereto, the width of such bolster being relatively greater than its thickness and means for turning said bolster on its edge, substantially as shown and described.

5. In a device of the class described, the combination with a wheeled truck, and a plurality of fixed bolsters on which the load normally rests and by which the load is spaced from the upper face of the truck, of an unattached bolster insertible beneath the load and between the same and the truck, said last-named bolster being of relatively greater width than its thickness, and means for turning said last-named bolster on an edge to elevate the load, substantially as shown and described.

In testimony whereof I have signed my name to this specification in the presence of two subscribing witnesses.

JOSEPH AUSTEN SAYWARD.

In presence of—
F. M. RATTENBURY,
J. A. SPECK.